US009343082B2

(12) United States Patent
Burger et al.

(10) Patent No.: US 9,343,082 B2
(45) Date of Patent: May 17, 2016

(54) SYSTEMS AND METHODS FOR DETECTING HEAD CONTACT

(75) Inventors: Harley Burger, San Jose, CA (US); David Fitzgerald, Inver Grove Heights, MN (US); Jason P. Brenden, Woodbury, MN (US); Stephen Kuehne, Rosemount, MN (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1278 days.

(21) Appl. No.: 12/750,675

(22) Filed: Mar. 30, 2010

(65) Prior Publication Data

US 2011/0242691 A1    Oct. 6, 2011

(51) Int. Cl.
*G11B 5/02*    (2006.01)
*G11B 5/012*    (2006.01)
*G11B 5/60*    (2006.01)

(52) U.S. Cl.
CPC    *G11B 5/02* (2013.01); *G11B 5/012* (2013.01); *G11B 5/6005* (2013.01); *G11B 5/6064* (2013.01)

(58) Field of Classification Search
CPC ................................. G11B 5/02; G11B 5/012
USPC ............................................... 360/31, 75, 39
See application file for complete search history.

(56) References Cited

U.S. PATENT DOCUMENTS

| | | | |
|---|---|---|---|
| 4,532,802 A * | 8/1985 | Yeack-Scranton et al. .. | 73/866.4 |
| 4,942,609 A * | 7/1990 | Meyer ............................. | 360/25 |
| 5,278,846 A | 1/1994 | Okayama et al. | |
| 5,317,472 A | 5/1994 | Schweitzer, III | |
| 5,325,402 A | 6/1994 | Ushirokawa | |
| 5,392,299 A | 2/1995 | Rhines et al. | |
| 5,471,500 A | 11/1995 | Blaker et al. | |
| 5,513,192 A | 4/1996 | Janku et al. | |
| 5,550,870 A | 8/1996 | Blaker et al. | |
| 5,612,964 A | 3/1997 | Haraszti | |
| 5,701,314 A | 12/1997 | Armstrong et al. | |
| 5,710,784 A | 1/1998 | Kindred et al. | |
| 5,712,861 A | 1/1998 | Inoue et al. | |
| 5,717,706 A | 2/1998 | Ikeda | |
| 5,802,118 A | 9/1998 | Bliss et al. | |
| 5,810,477 A | 9/1998 | Abraham et al. | |
| 5,844,945 A | 12/1998 | Nam et al. | |
| 5,898,710 A | 4/1999 | Amrany | |

(Continued)

FOREIGN PATENT DOCUMENTS

| | | |
|---|---|---|
| EP | 2031759 | 3/2004 |
| JP | 2005-093055 | 4/2005 |

(Continued)

OTHER PUBLICATIONS

U.S. Appl. No. 11/461,026, filed Jul. 31, 2006, Tan, Weijun.

(Continued)

*Primary Examiner* — Fred Tzeng

(57) ABSTRACT

Various embodiments of the present invention provide systems and methods for determining contact with a storage medium. As an example, a data storage system is disclosed that includes: a head assembly and a data processing circuit. The head includes a head disk interface sensor operable to provide a contact signal indicating contact between the head and a storage medium disposed in relation to the head. The data processing circuit is operable to process the contact signal to yield an indication of a contact between the storage medium and the head.

23 Claims, 5 Drawing Sheets

(56) References Cited

U.S. PATENT DOCUMENTS

| | | |
|---|---|---|
| 5,923,713 A | 7/1999 | Hatakeyama |
| 5,978,414 A | 11/1999 | Nara |
| 5,983,383 A | 11/1999 | Wolf |
| 6,005,897 A | 12/1999 | McCallister et al. |
| 6,023,783 A | 2/2000 | Divsalar et al. |
| 6,029,264 A | 2/2000 | Kobayashi et al. |
| 6,039,091 A * | 3/2000 | Rodgers et al. ............... 141/83 |
| 6,041,432 A | 3/2000 | Ikeda |
| 6,065,149 A | 5/2000 | Yamanaka |
| 6,097,559 A * | 8/2000 | Ottesen et al. ............... 360/31 |
| 6,097,764 A | 8/2000 | McCallister et al. |
| 6,145,110 A | 11/2000 | Khayrallah |
| 6,176,132 B1 * | 1/2001 | MacLauchlan ............ 73/290 V |
| 6,191,901 B1 | 2/2001 | Carlson |
| 6,216,249 B1 | 4/2001 | Bliss et al. |
| 6,216,251 B1 | 4/2001 | McGinn |
| 6,229,467 B1 | 5/2001 | Eklund et al. |
| 6,266,795 B1 | 7/2001 | Wei |
| 6,317,472 B1 | 11/2001 | Choi et al. |
| 6,351,832 B1 | 2/2002 | Wei |
| 6,377,610 B1 | 4/2002 | Hagenauer et al. |
| 6,381,726 B1 | 4/2002 | Weng |
| 6,438,717 B1 | 8/2002 | Butler et al. |
| 6,473,878 B1 | 10/2002 | Wei |
| 6,476,989 B1 | 11/2002 | Chainer et al. |
| 6,625,775 B1 | 9/2003 | Kim |
| 6,657,803 B1 | 12/2003 | Ling et al. |
| 6,671,404 B1 | 12/2003 | Kawatani et al. |
| 6,689,948 B2 * | 2/2004 | Raisanen ............... 84/733 |
| 6,748,034 B2 | 6/2004 | Hattori et al. |
| 6,757,862 B1 | 6/2004 | Marianetti |
| 6,785,863 B2 | 8/2004 | Blankenship et al. |
| 6,788,654 B1 | 9/2004 | Hashimoto et al. |
| 6,810,502 B2 | 10/2004 | Eidson |
| 6,980,382 B2 | 12/2005 | Hirano et al. |
| 6,986,098 B2 | 1/2006 | Poeppelman |
| 7,010,051 B2 | 3/2006 | Murayama et al. |
| 7,047,474 B2 | 5/2006 | Rhee et al. |
| 7,058,873 B2 | 6/2006 | Song et al. |
| 7,073,118 B2 | 7/2006 | Greenberg et al. |
| 7,093,179 B2 | 8/2006 | Shea |
| 7,113,356 B1 | 9/2006 | Wu |
| 7,173,783 B1 | 2/2007 | McEwen et al. |
| 7,184,486 B1 | 2/2007 | Wu et al. |
| 7,191,378 B2 | 3/2007 | Eroz et al. |
| 7,203,015 B2 | 4/2007 | Sakai et al. |
| 7,203,887 B2 * | 4/2007 | Eroz et al. ............... 714/758 |
| 7,236,757 B2 | 6/2007 | Raghaven et al. |
| 7,257,764 B2 | 8/2007 | Suzuki et al. |
| 7,310,768 B2 | 12/2007 | Eidson et al. |
| 7,313,750 B1 | 12/2007 | Feng et al. |
| 7,370,258 B2 | 5/2008 | Iancu et al. |
| 7,403,752 B2 | 7/2008 | Raghaven et al. |
| 7,430,256 B2 | 9/2008 | Zhidkov |
| 7,502,189 B2 | 3/2009 | Sawaguchi et al. |
| 7,505,537 B1 | 3/2009 | Sutardja |
| 7,523,375 B2 | 4/2009 | Spencer |
| 7,587,657 B2 | 9/2009 | Haratsch |
| 7,590,168 B2 | 9/2009 | Raghaven et al. |
| 7,702,989 B2 | 4/2010 | Graef et al. |
| 7,712,008 B2 | 5/2010 | Song et al. |
| 7,801,200 B2 | 9/2010 | Tan |
| 7,802,163 B2 | 9/2010 | Tan |
| 7,839,597 B2 * | 11/2010 | Nagasaka ............... 360/75 |
| 2003/0063405 A1 | 4/2003 | Jin et al. |
| 2003/0081693 A1 | 5/2003 | Raghaven et al. |
| 2003/0087634 A1 | 5/2003 | Raghaven et al. |
| 2003/0112896 A1 | 6/2003 | Raghaven et al. |
| 2003/0134607 A1 | 7/2003 | Raghaven et al. |
| 2004/0071206 A1 | 4/2004 | Takatsu |
| 2004/0098659 A1 | 5/2004 | Bjerke et al. |
| 2005/0010855 A1 | 1/2005 | Lusky |
| 2005/0111540 A1 | 5/2005 | Modrie et al. |
| 2005/0157780 A1 | 7/2005 | Werner et al. |
| 2005/0195749 A1 | 9/2005 | Elmasry et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031737 A1 | 2/2006 | Chugg et al. |
| 2006/0123285 A1 | 6/2006 | De Araujo et al. |
| 2006/0140311 A1 | 6/2006 | Ashley et al. |
| 2006/0168493 A1 | 7/2006 | Song et al. |
| 2006/0195772 A1 | 8/2006 | Graef et al. |
| 2006/0248435 A1 | 11/2006 | Haratsch |
| 2006/0256670 A1 | 11/2006 | Park et al. |
| 2007/0011569 A1 | 1/2007 | Casado et al. |
| 2007/0047635 A1 | 3/2007 | Stojanovic et al. |
| 2007/0110200 A1 | 5/2007 | Mergen et al. |
| 2007/0230407 A1 | 10/2007 | Petrie et al. |
| 2007/0286270 A1 | 12/2007 | Huang et al. |
| 2008/0049825 A1 | 2/2008 | Chen et al. |
| 2008/0055122 A1 | 3/2008 | Tan |
| 2008/0065970 A1 | 3/2008 | Tan |
| 2008/0069373 A1 | 3/2008 | Jiang et al. |
| 2008/0168330 A1 | 7/2008 | Graef et al. |
| 2009/0141391 A1 | 6/2009 | Kuramoto et al. |
| 2009/0199071 A1 | 8/2009 | Graef |
| 2009/0235116 A1 | 9/2009 | Tan et al. |
| 2009/0235146 A1 | 9/2009 | Tan |
| 2009/0259915 A1 | 10/2009 | Livshitz et al. |
| 2009/0273492 A1 | 11/2009 | Yang et al. |
| 2009/0274247 A1 | 11/2009 | Galbraith et al. |
| 2010/0002795 A1 | 1/2010 | Raghaven et al. |
| 2010/0061492 A1 | 3/2010 | Noeldner |
| 2010/0070837 A1 | 3/2010 | Xu et al. |
| 2010/0164764 A1 | 7/2010 | Nayak |
| 2010/0185914 A1 | 7/2010 | Tan et al. |

FOREIGN PATENT DOCUMENTS

| | | |
|---|---|---|
| JP | 2007-157185 | 6/2007 |
| JP | 2007-179717 | 7/2007 |
| JP | 2008-077751 | 4/2008 |
| JP | 2008-226370 | 9/2008 |
| WO | WO 2006/016751 | 2/2006 |

OTHER PUBLICATIONS

U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.
U.S. Appl. No. 12/792,555, filed Jun. 2, 2101, Liu, et al.
U.S. Appl. No. 12/887,330, filed Sep. 21, 2010, Zhang, et al.
U.S. Appl. No. 12/887,369, filed Sep. 21, 2010, Liu et al.
U.S. Appl. No. 12/901,816, filed Oct. 11, 2010, Li et al.
U.S. Appl. No. 12/917,756, filed Nov. 2, 2010, Miladinovic et al.
U.S. Appl. No. 12/947,931, filed Nov. 17, 2010, Yang, Shaohua.
U.S. Appl. No. 12/947,947, filed Nov. 17, 2010, Ivkovic et al.
U.S. Appl. No. 12/972,942, filed Dec. 20, 2010, Liao et al.
Casado et al., Multiple-rate low-denstiy parity-check codes with constant blocklength, IEEE Transations on communications, Jan. 2009, vol. 57, pp. 75-83.

* cited by examiner

SYSTEMS AND METHODS FOR DETECTING HEAD CONTACT

BACKGROUND OF THE INVENTION

The present inventions are related to data storage, and more particularly to systems and methods for detecting contact between a sensor and a storage medium.

A read channel integrated circuit is a component of a magnetic storage device. In operation, a read channel component converts and encodes data to enable a read/write head assembly to write data to a disk and to subsequently read data back. In, for example, a hard disk drive, the disk typically includes many tracks containing encoded data that extend around the disk in a radial pattern. Each track includes one or more user data regions as well as intervening servo data regions. The information of the servo data regions is used to position the read/write head assembly in relation to the disks so that the information stored in the user data regions may be retrieved accurately.

FIG. 1 shows a storage medium 100 with two exemplary tracks 150, 155 indicated as dashed lines. The tracks are segregated by servo data written within wedges 160, 165. These wedges include data and supporting bit patterns 110 that are used for control and synchronization of the read/write head assembly over a desired location on storage medium 100. In particular, these wedges generally include a preamble pattern 152 followed by a sector address mark 154 (SAM). Sector address mark 154 is followed by a Gray code 156, and Gray code 156 is followed by burst information 158. It should be noted that while two tracks and two wedges are shown, hundreds of each would typically be included on a given storage medium. Further, it should be noted that a servo data set may have two or more fields of burst information. Between the bit patterns 110, a region of user data 184 is provided. Such user data regions 184 include various overhead and wasted areas resulting in a reduction in the density of data maintained in the region of user data 184.

Reading and writing storage medium 100 is done using a read/write head assembly (not shown) disposed in relation to storage medium 100. At times due either to anomalies on the surface of storage medium 100 or improper placement of the read/write head assembly, the read/write head assembly comes into contact with storage medium 100. This can result in damage to either the surface of storage medium 100 and/or to the read/write head assembly. Where the contact is not accurately detected, the same contact may be repeated later and/or data may be written to a damaged area of storage medium 100 resulting in a potential data loss.

Hence, for at least the aforementioned reasons, there exists a need in the art for advanced systems and methods for determining contact with a storage medium.

BRIEF SUMMARY OF THE INVENTION

The present inventions are related to data storage, and more particularly to systems and methods for detecting contact between a sensor and a storage medium.

Various embodiments of the present invention provide data storage systems that include a read/write head assembly and a data processing circuit. The read/write head assembly includes a head disk interface sensor operable to provide a contact signal indicating contact between the read/write head assembly and a storage medium disposed in relation to the read/write head assembly. The data processing circuit is operable to process the contact signal to yield an indication of a contact between the storage medium and the read/write head assembly.

In some instances of the aforementioned embodiments, the read/write head assembly further includes a read head operable to sense information maintained on the storage medium and to provided a read signal corresponding to the sensed information. In some such instances, the data processing circuit is further operable to process the read signal to derive data originally provided for storage on the storage medium. In particular cases, the data processing circuit includes a data detector circuit and a data decoder circuit. The data decoder circuit may be, for example, a low density parity check decoder circuit.

In other instances of the aforementioned embodiments, the data storage system further includes a preamplifier circuit that receives both the contact signal and the read signal, and selects one of the contact signal or the read signal to provide to the data processing circuit. In some such instances, the preamplifier is operable to filter and amplify the read signal. In various instances, the preamplifier is operable to filter and amplify the contact signal. In one or more of such instances, the preamplifier is operable to filter and amplify the selected one of the read signal and the contact signal. In yet further such instances, the preamplifier includes an analog multiplexer that receives both the read signal and the contact signal, and provides the selected one of the read signal and the contact signal.

Other embodiments of the present invention provide methods for data processing. The methods include providing a read/write head assembly having a read head and a head disk interface sensor; and receiving a read signal from the read head. The read signal corresponds to information stored on a storage medium disposed in relation to the read/write head assembly. The methods further include receiving a contact signal from the head disk interface; selecting the contact signal for processing; passing the contact signal to a data processing circuit; and processing the contact signal to determine an occurrence of a contact between the read/write head assembly and the storage medium.

In some instances of the aforementioned embodiments, the methods further include selecting the read signal for processing; passing the read signal to the data processing circuit; and processing the read signal to determine the data originally directed for writing to the storage medium. In some such instances, the methods further include providing an analog multiplexer circuit that receives both the contact signal and the read signal. In such cases, selecting the read signal includes asserting a selection control such that the read signal is provided as an output of the analog multiplexer circuit.

In various instances of the aforementioned embodiments, determining the occurrence of the contact between the read/write head assembly and the storage medium includes determining whether the contact signal exceeds a threshold. In other instances, the methods further include providing an analog multiplexer circuit that receives both the contact signal and the read signal. In such instances, selecting the contact signal includes asserting a selection control such that the contact signal is provided as an output of the analog multiplexer circuit.

Yet other embodiments of the present invention provide contact indication circuits. Such circuits include: a read/write head assembly including a head disk interface sensor operable to provide a contact signal indicating contact between the read/write head assembly and a storage medium disposed in relation to the read/write head assembly; a read head operable to sense information maintained on the storage medium and to provided a read signal corresponding to the sensed information; and a data processing circuit operable to process a selected one of: the contact signal to yield an indication of a contact between the storage medium and the read/write head assembly, and the read signal to derive data originally directed toward the storage medium.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 3a is a block diagram of contact detection circuitry distributed across the preamplifier, the read channel and the read/write head assembly of the circuit of FIG. 2a;

FIG. 3b is a block diagram of another contact detection circuitry distributed across the preamplifier, the read channel and the read/write head assembly of the circuit of FIG. 2a.

DETAILED DESCRIPTION OF THE INVENTION

The present inventions are related to data storage, and more particularly to systems and methods for detecting contact between a sensor and a storage medium.

Various embodiments of the present invention provide systems and methods for determining whether contact has occurred between a head and a storage medium. The head includes a head disk interface and a read head. As used herein, the phrases "head disk interface" or "head disk interface sensor" are used in their broadest sense to mean any sensor that is capable of providing a contact signal indicative of whether contact has occurred with the head in which it is incorporated. Based upon the disclosure provided herein, one of ordinary skill in the art will recognize a variety of head disk interfaces that may be used in relation to embodiments of the present invention. As used herein, the term "head" is used in its broadest sense to mean any assembly including one or more sensors that may be disposed in relation to the storage medium. As an example, a head may be a read head assembly including a read head for sensing previously stored information from the storage medium. Such a read head provides a read signal corresponding to information sensed from the storage medium. As another example, a head may be a read/write head assembly including a write head for writing data to the storage medium and a read head for sensing previously stored information from the storage medium. Based upon the disclosure provided herein, one of ordinary skill in the art will recognize a variety of heads that may be used in relation to different embodiments of the present invention.

In some of the embodiments, the contact signal is provided to a data processing circuit in place of the read signal. The data processing circuit is designed to process a received read signal to recover the data that was originally directed to be written to the storage medium. When the contact signal is provided to the data processing circuit, the data processing circuit is used to determine whether the contact signal indicates that a contact between the head and the storage medium has occurred. As used herein, the phrase "data processing circuit" is used in its broadest sense to mean any circuit that is capable of processing a received signal. In some cases, the data processing circuit is further identified as capable of processing the read signal to recover originally written data. As an example, a data processing circuit may include a data detector circuit and a decoder circuit. The data detector circuit may be, but is not limited to, a soft output Viterbi algorithm detector circuit. The decoder circuit may be, but is not limited to, a low density parity check (LDPC) decoder circuit or a Reed Solomon decoder circuit. Based upon the disclosure provided herein, one of ordinary skill in the art will recognize a variety of data processing circuits that may be designed for processing information from both a head disk interface and a read head.

Figure 1:
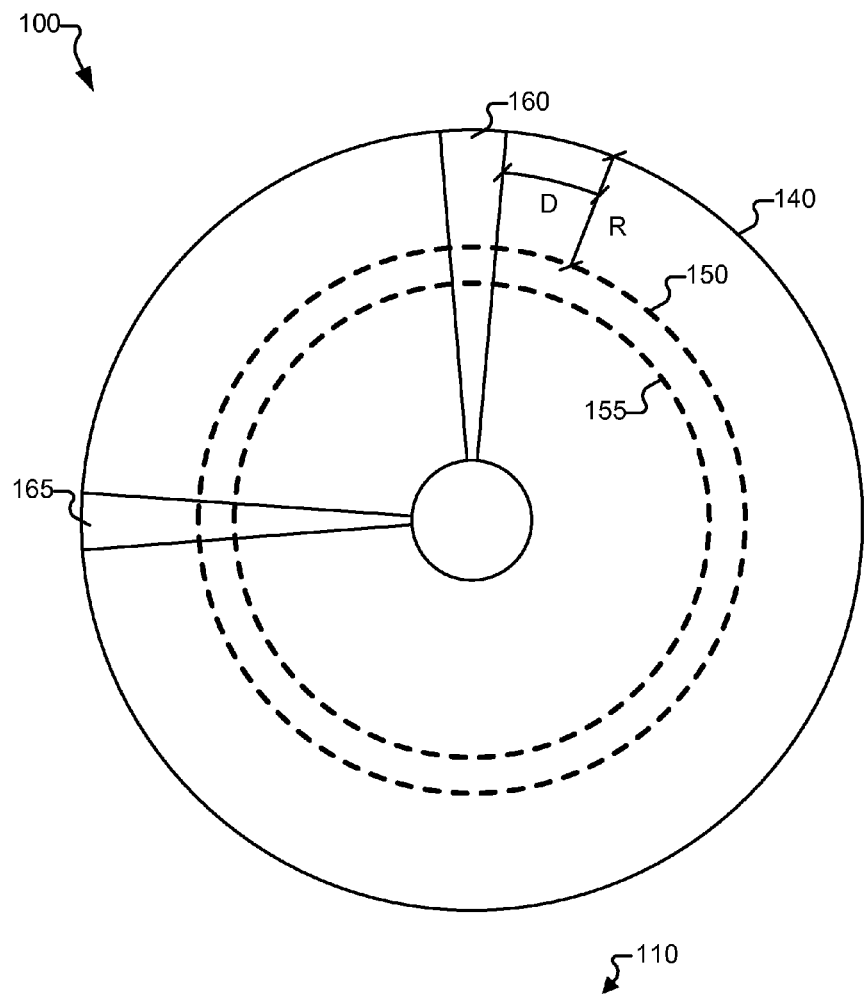
FIG. 1 depicts an existing storage medium including servo data.
Figure 1:
Figure 1:
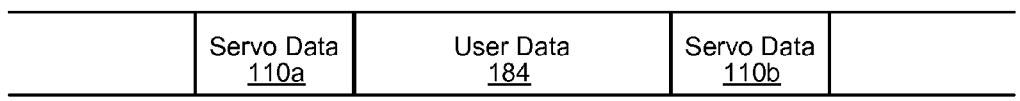
Figure 2A:
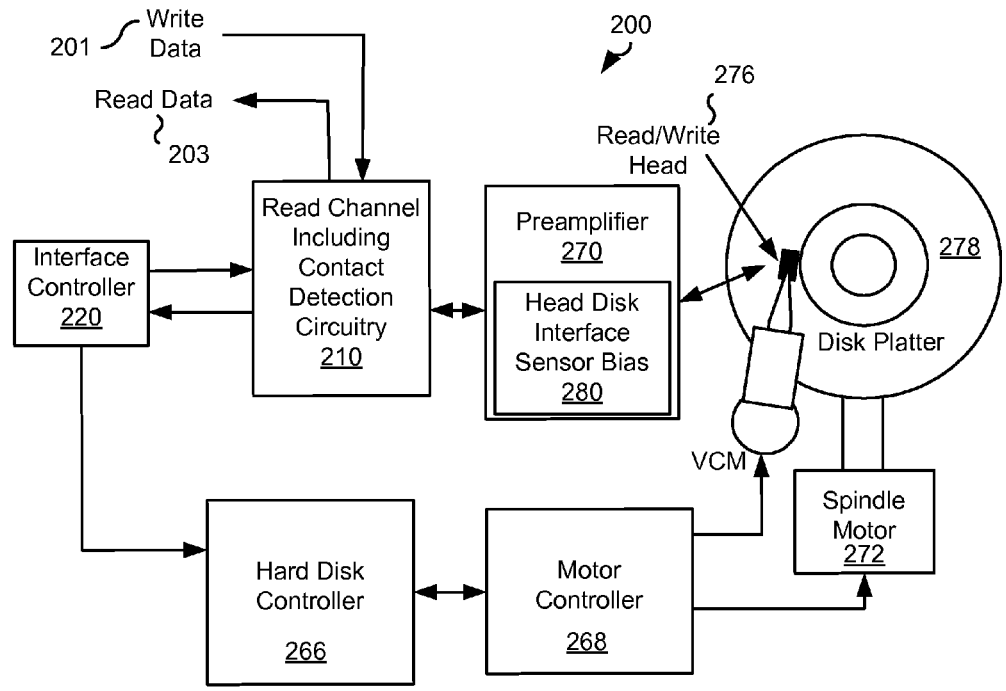
FIG. 2a depicts a storage device including a read channel with contact detection circuitry in accordance with one or more embodiments of the present invention.

Turning to FIG. 2a, a storage system 200 including a read channel 210 with contact detection circuitry is shown in accordance with one or more embodiments of the present invention. Storage system 200 may be, for example, a hard disk drive. Read channel 210 may include contact detection circuitry that operates in relation to information available from a preamplifier 270, a read/write head assembly 276 and a head disk interface sensor bias 280. One implementation of such contact detection circuitry is discussed below in relation to FIG. 3, and one method for operating such contact detection circuitry is discussed below in relation to FIG. 4.

In addition to read channel 210, storage system 200 includes preamplifier 270 that amplifies a minute electrical signal received from read/write head assembly 276. Read/write head assembly 276 is disposed in relation to a disk platter 278. Storage system 200 also includes an interface controller 220, a hard disk controller 266, a motor controller 268, and a spindle motor 272. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with a perpendicular recording scheme. In other embodiments of the present invention, disk platter 278 includes magnetic signals recorded in accordance with a longitudinal recording scheme.

In a typical read operation, read/write head assembly 276 is accurately positioned by motor controller 268 over a desired data track on disk platter 278. Motor controller 268 both positions read/write head assembly 276 in relation to disk platter 278 and drives VCM by moving read/write head assembly 276 to the proper data track on disk platter 278 under the direction of hard disk controller 266. Spindle motor 272 spins disk platter 278 at a determined spin rate (RPMs). Once read/write head assembly 278 is positioned adjacent to the proper data track, magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel 210 via preamplifier 270. Preamplifier 270 is operable to amplify the minute analog signals accessed from disk platter 278. In turn, read channel 210 decodes and digitizes the received analog signal to recreate the information originally written to disk platter 278. This data is provided as read data 203 to a receiving circuit. A write operation is substantially the opposite of the preceding read operation with write data 201 being provided to read channel module 210. This data is then encoded and written to disk platter 278.

At some points, information from the read head of read/write head assembly 276 that is provided to read channel 210 may be replaced by information from a head disk interface of read/write head assembly 276. This contact information is processed by the read channel to determine whether a contact between read/write head assembly 276 and disk platter 278 has occurred. Where such a contact is indicated, read channel 210 asserts a contact event detected output signal 202. Intermittently, switching may occur between the read head and the head disk interface sensor allowing read channel 210 to access and process servo data from disk platter 278. This intermittent servo data access allows for identifying the location of read/write head assembly 276 in relation to disk platter 278. Where such location information is available, it may be provided as part of contact event detected output 202 such that a receiving host (not shown) is made aware of both the occurrence of a contact event and the location of the contact event. This allows the receiving host to map the particular problem area on disk platter 278, and to avoid further use of the identified location.

Figure 2B:
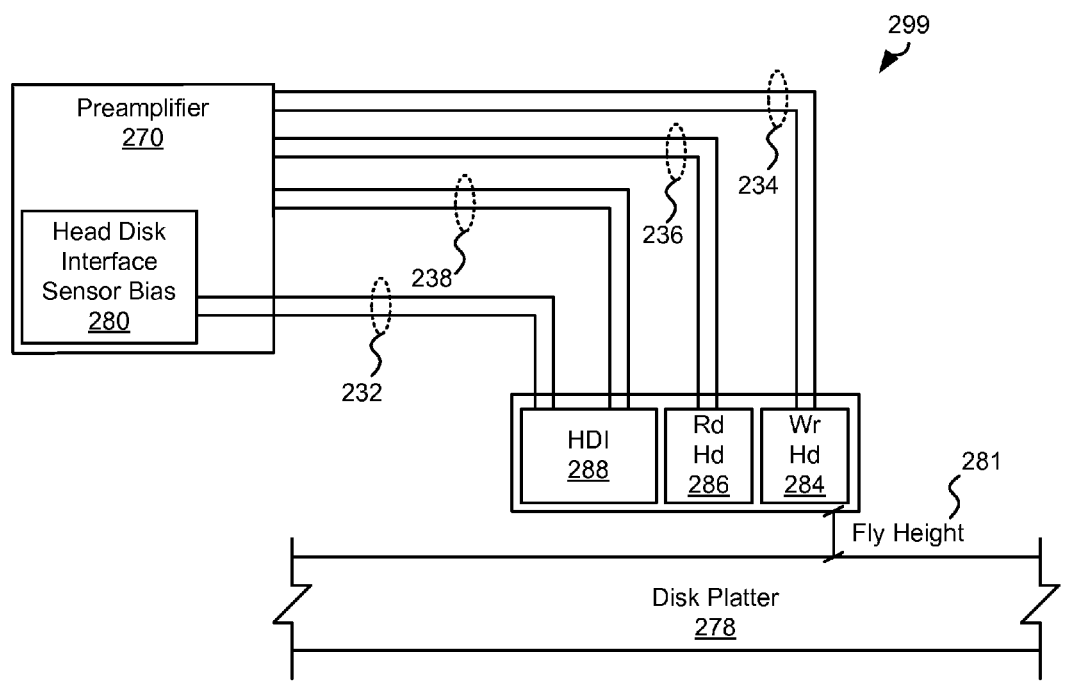
FIG. 2b depicts a subset of the circuit of FIG. 2a that may be used in relation to various embodiments of the present invention.

FIG. 2b shows a subset 299 of the circuit of FIG. 2a. Subset 299 includes the connections between preamplifier 270, head disk interface sensor bias 280, and read/write head assembly 276. As shown, read/write head assembly 276 are maintained above disk platter 278 at a distance identified as fly height 281. The smaller fly height 281 is maintained, the greater the bit density that can be written to disk platter 278 and the higher the signal to noise ratio of the data read back from disk platter 278. Thus, the distance of fly height 278 directly impacts the amount of data that can be stored to disk platter 278.

Read/write head assembly 276 includes a write head 284, a read head 286, and a head disk interface sensor 288. Write head 284 may be any transducer known in the art that is capable of generating a magnetic field corresponding to an information pattern received via an electrical signal 234. When generated in close proximity to disk platter 278, this magnetic field creates a substantially non-volatile pattern on disk platter 278 that may be sensed at a later juncture. Based upon the disclosure provided herein, one of ordinary skill in the art will recognize a variety of write transducers that may be used in relation to different embodiments of the present invention. Read head 286 may be any transducer known in the art that is capable of sensing a magnetic pattern on disk platter 278 and converting the sensed magnetic pattern into a corresponding electrical signal 236. Therefore, read head 286 is used to sense or "read" data maintained on disk platter 278. Based upon the disclosure provided herein, one of ordinary skill in the art will recognize a variety of read transducers that may be used in relation to different embodiments of the present invention.

Head disk interface sensor 288 may be any sensor known in the art that is able to detect the occurrence of contact between read/write head assembly 276 and disk platter 278, and to provide an indication of any detected contact via an electrical signal 238. Such contact may be light contact that results in damage to disk platter 278 and/or read/write head assembly 276 only after it is repeated multiple times, or heavy contact that are more significant contact events. Such contact events are sometimes referred to as "thermal asperities" due to the significant increase in head temperature when it contacts disk platter 278. Head disk interface sensor 288 may be located near write head 284 and read head 286 in the same assembly.

As one example, head disk interface sensor 288 may be modeled as a resistance across which a direct current bias 232 generated by head disk interface sensor bias 280 is applied. If read/write head assembly 276 makes contact with disk platter 278, kinetic energy is released resulting in an increase in the substrate temperature of head disk interface sensor 288. This increase in temperature causes the resistance of head disk interface sensor 288 to change, thereby changing the voltage drop across head disk interface sensor 288. The change in the resistance of head disk interface sensor 288 may be either an increase or a decrease depending upon the sign of the temperature coefficient of the sensor. Also, it should be noted that the change in resistance may be detected by monitoring either a change in voltage dropped across head disk interface sensor 288 or a change in current through head disk interface sensor 288. Based upon the disclosure provided herein, one of ordinary skill in the art will recognize a variety of head disk interface sensors that may be used in relation to different embodiments of the present invention. For example, a head disk interface sensor 288 utilizing a low bandwidth voltage applied to the resistance and sense the change in voltage or current.

In some cases, electrical signal 238 includes a current representing the current through head disk interface sensor 288. This current may be amplified and the amplified current passed across a reference resistor (not shown) in preamplifier 270 to yield a voltage that caries in accordance with the resistance across head disk interface sensor 288. The reference voltage is provided to a comparator (not shown) in preamplifier that compares the reference voltage with a threshold voltage. Where the reference voltage exceeds the threshold voltage, preamplifier 270 provides a signal to read channel 210 indicating that a contact between read/write head assembly 276 and disk platter 278 has occurred. Such an approach advantageously incorporates the contact detection within preamplifier 270. However, such an approach may not be able to detect contact incidents corresponding to only minor contacts as the reference voltage may not exceed the threshold voltage.

Due to chip area and power consumption constraints and/or process technology constraints of preamplifier 270, it may not be possible to implement a more sophisticated contact detection system within read/write head assembly 276. In some embodiments of the present invention, preamplifier 270 may be modified to select between either electrical signal 236 from read head 286 and electrical signal 238 from head disk interface sensor 288 to be amplified and provided to read channel 210. In such a case, the circuitry included in read channel 210 that is generally used to process the amplified electrical signal 236 to yield data originally written to disk platter 278 may be used to process amplified electrical signal 238 to determine whether a contact event has occurred, and the significance of the contact event. Whereas the previously described threshold detection method in its simplest form only yields a binary indication that a contact event occurred, processing by read channel 210 provides an ability to not only determine that a contact event occurred, but to quantify the magnitude of the contact event based upon the value derived from electrical signal 238.

Switching between electrical signal 238 from head disk interface sensor 288 and electrical signal 236 from read head 286 may be done using any type of switch known in the art. The switch may be governed via an external input to read/write head assembly 276. This pin may be driven based upon the output of read head 286 either prior to processing by read channel 210, or after processing by read channel 210. During operation, when processing data derived from head disk interface sensor 288, an intermittent switch to processing of data derived from read head 286 may be desired to process servo data on disk platter 278. Such intermittent processing of the servo data allows for identification of where read/write head assembly 276 is disposed relative to disk platter 278. Where such location information is available, any contact information generated by read channel 210 may be augmented to include location information associated with the contact. This location augmented contact information may be provided upstream to a host that may map the particular locations where contacts occur to avoid future use of the locations. This avoids both the potential for loss of data due to using a damaged portion of disk platter 278 and/or reduces the potential for re-contacting disk platter 278 are the identified location.

Figure 3A:
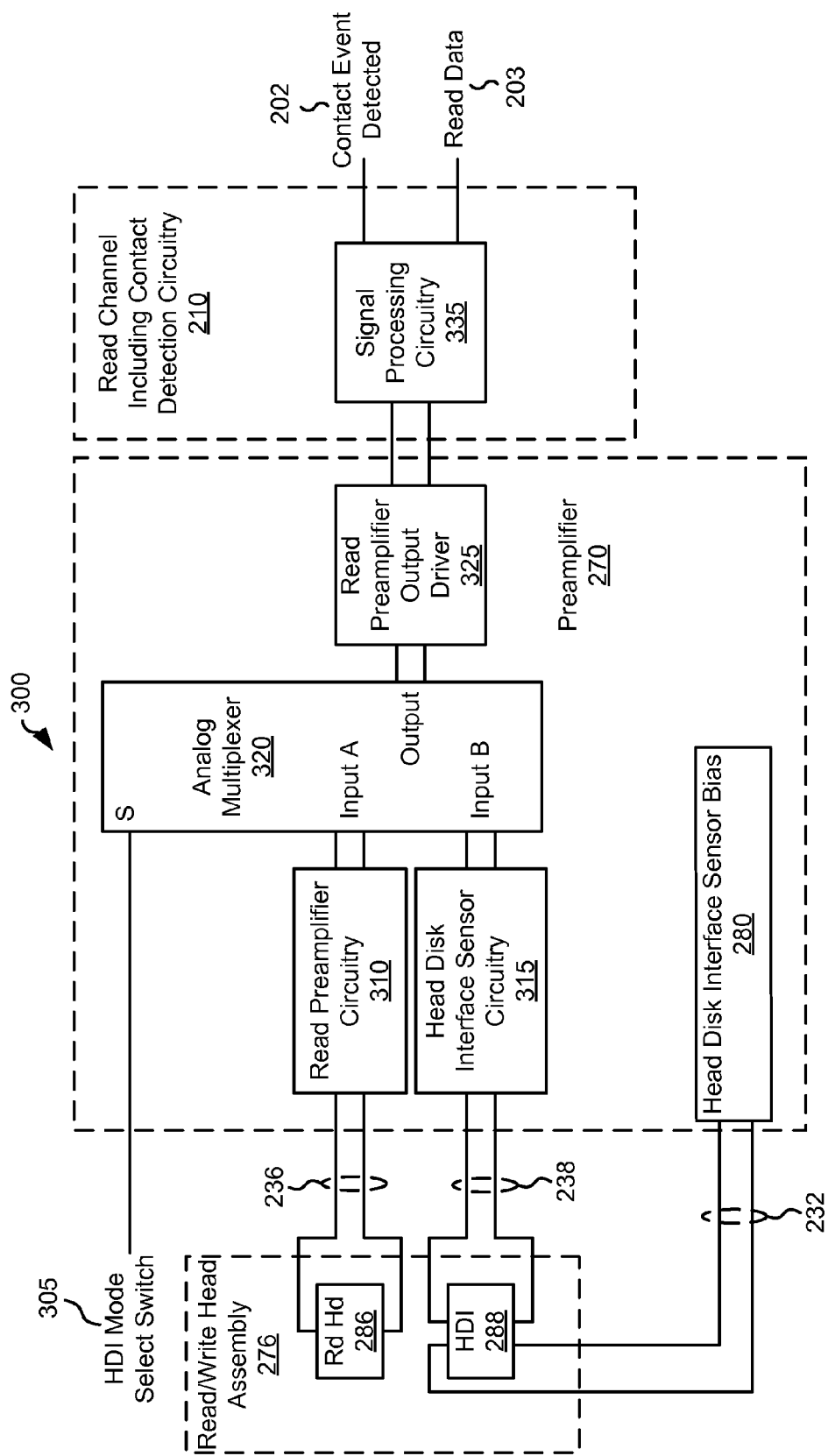

Turning to FIG. 3a, a block diagram of a contact detection circuit 300 distributed across the preamplifier, the read channel and the read/write head assembly of storage system 200 is shown in accordance with various embodiments of the present invention. Contact detection circuit 300 incorporates head disk interface sensor 288 included in read/write head assembly 276. In addition, read head 286 is included. Head disk sensor bias 280 is applied to head disk interface sensor 288 as previously discussed. Electrical signal 236 from read head 276 is provided to a read preamplifier circuitry 310 that is incorporated as part of preamplifier 270. Read preamplifier circuitry 310 may be any amplifier circuitry known in the art capable of receiving an electrical signal from a read head and amplifying it for use by a downstream read channel. In one particular embodiment of the present invention, read preamplifier circuitry 310 includes a low noise amplifier incorporating a high pass filter followed by a programmable gain amplifier. Based upon the disclosure provided herein, one of ordinary skill in the art will recognize other circuits that may be used in relation to different embodiments of the invention to receive and amplify electrical signal 232.

Electrical signal 238 from head disk interface sensor 288 is provided to a head disk interface sensor circuitry 315 that is incorporated as part of preamplifier 270. Head disk interface sensor circuitry 315 may be any amplifier circuitry known in the art capable of receiving an electrical signal from a head disk interface and amplifying it for use by a downstream read channel. In one particular embodiment of the present invention, head disk interface sensor circuitry 315 includes a low noise amplifier incorporating a high pass filter followed by a programmable gain amplifier. Based upon the disclosure provided herein, one of ordinary skill in the art will recognize other circuits that may be used in relation to different embodiments of the invention to receive and amplify electrical signal 238.

The output from head disk interface sensor circuitry 315 is provided to an input B of an analog multiplexer 320, and the output of read preamplifier circuitry 310 is provided to an input A of analog multiplexer 320. A selector input (S) of analog multiplexer 320 is driven by an HDI mode select signal 305. Analog multiplexer provides the selected output from head disk interface sensor circuitry 315 or the output of read preamplifier circuitry 310 to a read preamplifier output driver 325. Read preamplifier output driver massages the received signal and provides a corresponding signal with characteristics needed by signal processing circuitry 335 of read channel 210. Based upon the disclosure provided herein, one of ordinary skill in the art will recognize a variety of drive circuits that may be used in place of read preamplifier output driver 325 depending upon the particular design characteristics.

HDI mode select signal 305 is responsible for switching between standard read data processing (i.e., processing data derived from read head 286), and contact data processing (i.e., processing data derived from head disk interface sensor 288). In some embodiments of the present invention, HDI mode select signal 305 is generated by a processor (not shown) that is executing instructions maintained on a computer readable medium (not shown). In some cases, HDI mode select signal 305 is driven based upon data derived from read head 286 either before processing by read channel 210 or after processing by read channel 210. In other cases, HDI mode select signal 305 is manually selected by a user input. In some cases, the manual selection may be driven by the aforementioned processor. Based upon the disclosure provided herein, one of ordinary skill in the art will recognize a variety of drivers and/or drive conditions that may be employed to control the assertion level of HDI mode select signal 305, and thereby control the output selected from analog multiplexer 320.

Signal processing circuitry 335 may be any signal processing circuitry known in the art that is capable of receiving data derived from read head 286, identifying the location on a storage medium through processing servo data, and restoring the data originally written to the disk platter by a write circuit. The restored original data is provided as read data output 203. In one particular embodiment of the present invention, signal processing circuitry 335 may include one or more data detector circuits as are known in the art and/or one or more decoder circuits as are known in the art. Based upon the disclosure provided herein, one of ordinary skill in the art will recognize a variety of circuits that may be used to implement signal processing circuitry in relation to different embodiments of the present invention.

Signal processing circuitry 335 is reconfigurable to process data derived from head disk interface sensor 288. This includes determining any aberrations in the received signal, identifying a location of the aberrations in relation to the disk platter, and reporting contact events where the aberrations suggest such an event. An identified event and location thereof are provided as contact event detected output 202. This data may be provided to a processor or other controller that is operable to map problematic areas on the disk platter.

Figure 3B:
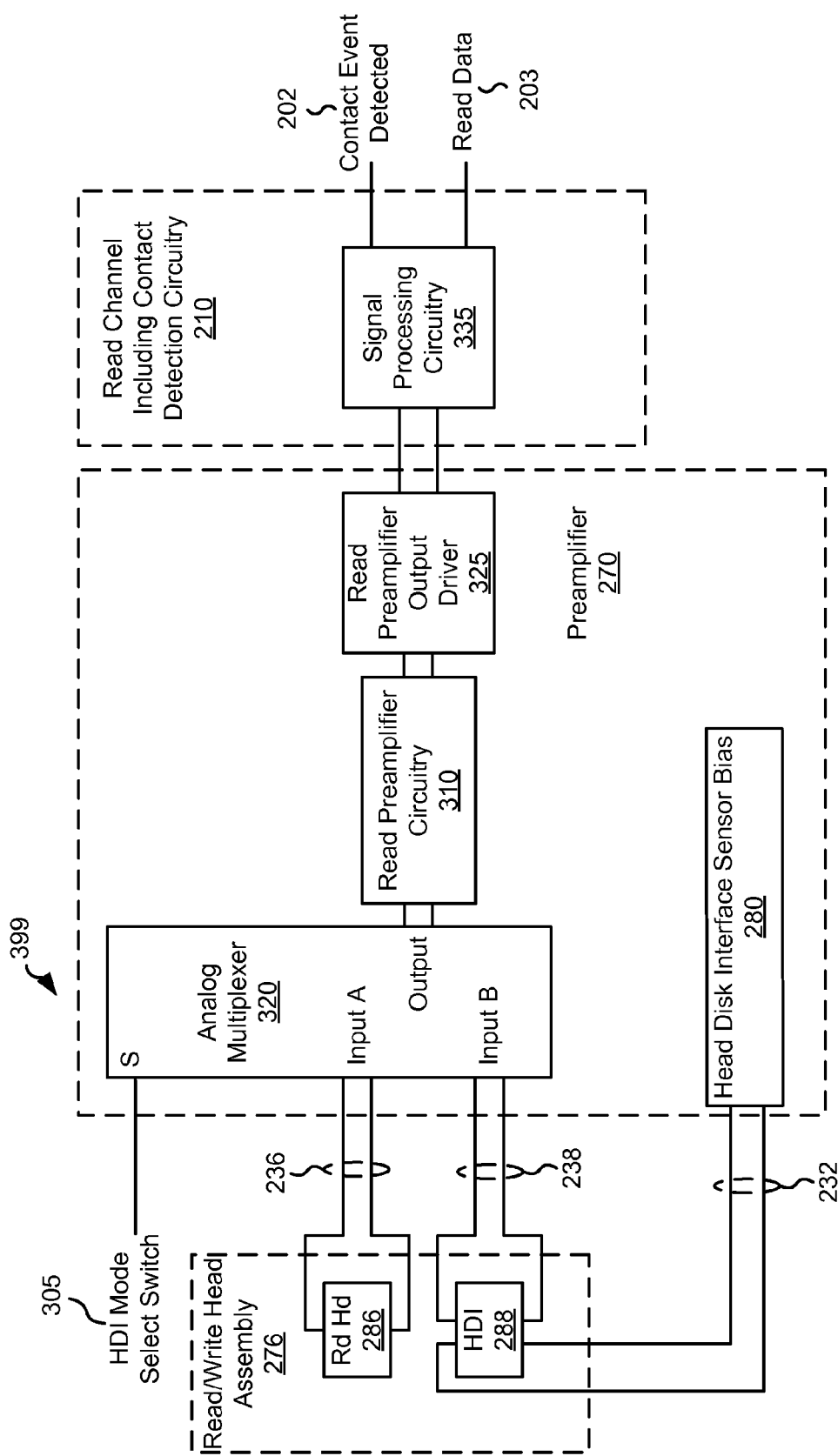

Turning to FIG. 3b, a block diagram of another contact detection circuit 399 distributed across the preamplifier, the read channel and the read/write head assembly of storage system 200 is shown in accordance with other embodiments of the present invention. Contact detection circuit 399 is substantially similar to contact detection circuit 300, except that contact detection circuit 399 uses read amplifier circuitry 310 to massage both the data derived from read head 286 and head disk interface sensor 288. This is done by moving read amplifier circuitry 310 from the input side of analog multiplexer 320 to the output side of analog multiplexer 320.

Figure 4:
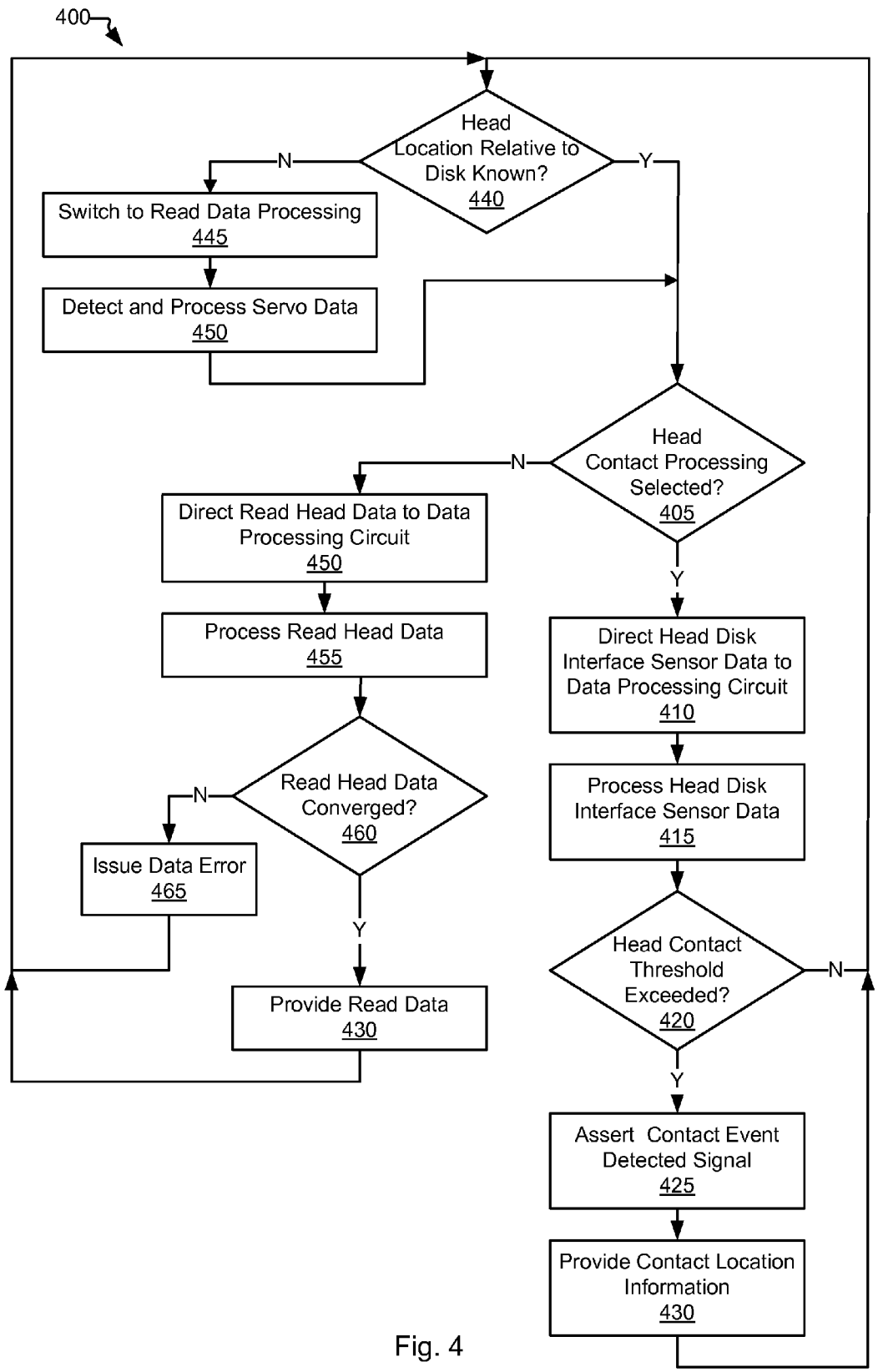
FIG. 4 is a flow diagram showing a method for processing head contact sensor data using read channel data processing circuitry in accordance with various embodiments of the present invention.

Turning to FIG. 4, a flow diagram 400 shows a method for processing head contact sensor data using read channel data processing circuitry in accordance with various embodiments of the present invention. Following flow diagram 400, it is determined whether the head location relative to the disk platter is known (block 440). Where the location is not known (block 440), then the process for determining the location is begun. In particular, read data processing is selected (block 445). This includes switching the data provided from the preamplifier circuit to the data derived from the read head of the read/write head assembly. This data derived from the read head is provided to a data processing circuit where standard data processing is applied. This includes detecting and processing servo data from the servo data regions distributed around the disk platter (block 450). This may be done using any process for detecting and processing servo data known in the art. This processed servo data provides an indication of where the read/write head assembly is located relative to the disk platter.

Where either the head location relative to the disk platter is known (block 440) or where the head location is newly established (blocks 445, 450), it is determined whether head contact processing is selected (block 405). Head contact processing includes selecting data derived from the head disk interface of the read/write head assembly in place of the data derived from the read head. Thus, where head contact processing is selected (block 405), data from the head disk interface sensor is directed to the data processing circuit by the preamplifier (block 410). The data processing circuit processes the data derived from the head disk interface sensor (block 415). This processing determines the magnitude of the voltage or current output from the head disk interface sensor. This data processing includes noise reduction processing and/or averaging. Based upon the disclosure provided herein, one of ordinary skill in the art will recognize a variety of approaches that may be used to process the data derived from the head disk interface sensor.

It is then determined whether the processed data exceeds one or more threshold values (block 420). Such threshold values may be programmable and are used to indicate whether contact between the read/write head assembly occurred, and the magnitude of the contact. Where a contact is detected (block 420), a contact event signal is asserted to a host (block 425) and location information identifying the location of the reported contact is provided to the host (block 430). In such cases, the host may be, for example, a processor communicably coupled to a computer readable medium. The computer readable medium includes instructions executed by the processor to perform tasks. In one case, the tasks performed may include mapping the contact location so that the location on the disk platter may be avoided. This can limit the number of contact events that occur and/or avoid data loss. Either where no contact event is identified (block 420) or the contact information has been reported (blocks 425, 430), the process is reported.

Alternatively, where head contact processing is not selected (block 405), read data is processed. This includes directing data derived from the read head of the read/write head assembly to the data processing circuit (block 450). This data from the read head is processed by the data processing circuit using approaches known in the art for recovering data originally written to the disk platter (block 455). It is then determined whether the data derived from the read head converged to the originally written data (block 460). Where the data converged (block 460), the recovered read data is provided to a requesting host (block 430). Alternatively, where the data failed to converge (block 460), a data error is issued (block 465).

In conclusion, the invention provides novel systems, devices, methods, formats and arrangements for detecting contact with a storage medium. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data storage system, the system comprising:
   a head including:
      a read head operable to sense information maintained on a storage medium disposed in relation to the head and to provide a read signal corresponding to the sensed information; and
      a head disk interface sensor operable to provide a contact signal indicating contact between the head and the storage medium;
   a data processing circuit operable to:
      process the read signal to derive data originally directed toward the storage medium; and
      process the contact signal to yield an indication of a contact between the storage medium and the head; and
   a preamplifier circuit, wherein the preamplifier circuit operable to receive both the contact signal and the read signal, and to select one of the contact signal or the read signal to provide to the data processing circuit.

2. The data storage system of claim 1, wherein the data processing circuit includes a data detector circuit and a data decoder circuit.

3. The data storage system of claim 2, wherein the data decoder circuit is a low density parity check decoder circuit.

4. The data storage system of claim 2, wherein the data detector circuit is operable to apply a data detection algorithm to the contact signal to quantify a magnitude of a contact event.

5. The data storage system of claim 2, wherein the data detector circuit is operable to apply a data detection algorithm to the contact signal to yield a detected output, and wherein the data decoder circuit is operable to apply a data decode algorithm to the detected output to quantify a magnitude of a contact event.

6. The data storage system of claim 5, wherein the detected output is a first detected output, wherein the data detector circuit is operable to apply the data detection algorithm to the read signal to yield a second detected output, and wherein the data decoder circuit is operable to apply the data decode algorithm to the second detected output to yield the data originally directed toward the storage medium.

7. The data storage system of claim 1, wherein the preamplifier is operable to filter and amplify the read signal.

8. The data storage system of claim 1, wherein the preamplifier is operable to filter and amplify the contact signal.

9. The data storage system of claim 1, wherein the preamplifier is operable to filter and amplify the selected one of the read signal and the contact signal.

10. The data storage system of claim 1, wherein the preamplifier includes an analog multiplexer that receives both the read signal and the contact signal, and provides the selected one of the read signal and the contact signal.

11. A method for data processing, the method comprising:
   providing a head having a read head and a head disk interface sensor;
   receiving a read signal from the read head, wherein the read signal corresponds to information stored on a storage medium disposed in relation to the head;
   receiving a contact signal from the head disk interface;

using a preamplifier circuit to receive both the contact signal and the read signal, and to in turn select the contact signal and then the read signal as a processing signal;
passing the processing signal to a data processing circuit;
processing the processing signal to determine an occurrence of a contact between the head and the storage medium; and
processing the processing signal to determine the data originally directed for writing to the storage medium.

12. The method of claim 11, wherein the method further comprises:
providing an analog multiplexer circuit, wherein the analog multiplexer circuit receives both the contact signal and the read signal; and
wherein selecting the read signal includes asserting a selection control such that the read signal is provided as an output of the analog multiplexer circuit.

13. The method of claim 11, wherein determining the occurrence of the contact between the head and the storage medium includes determining whether the contact signal exceeds a threshold.

14. The method of claim 11, wherein the method further comprises:
providing an analog multiplexer circuit, wherein the analog multiplexer circuit receives both the contact signal and the read signal; and
wherein selecting the contact signal includes asserting a selection control such that the contact signal is provided as an output of the analog multiplexer circuit.

15. A contact indication circuit, the circuit comprising:
a head including:
a head disk interface sensor operable to provide a contact signal indicating contact between the head and a storage medium disposed in relation to the head; and
a read head operable to sense information maintained on the storage medium and to provided a read signal corresponding to the sensed information;
a preamplifier circuit, wherein the preamplifier circuit operable to receive both the contact signal and the read signal, and to select one of the contact signal or the read signal to provide to a data processing circuit; and
a data processing circuit operable to process a selected one of: the contact signal to yield an indication of a contact between the storage medium and the head assembly, and the read signal to derive data originally directed toward the storage medium.

16. The circuit of claim 15, wherein the data processing circuit includes a data detector circuit and a data decoder circuit.

17. The circuit of claim 15, wherein the circuit further comprises:
a multiplexer operable to receive the read signal and the contact signal, and to provide one of the read signal or the contact signal as an output to the data processing circuit based at least in part on a selector input.

18. The circuit of claim 15, wherein the preamplifier is operable to filter and amplify the contact signal.

19. A data storage system, the system comprising:
a head including:
a read head operable to sense information maintained on a storage medium disposed in relation to the head and to provide a read signal corresponding to the sensed information; and
a head disk interface sensor operable to provide a contact signal indicating contact between the head and the storage medium;
a preamplifier circuit operable to receive both the contact signal and the read signal, and to select one of the contact signal and the read signal as a processing signal; and
a processing circuit operable to process the processing signal.

20. The data storage system of claim 19, wherein the contact signal is selected as the processing signal, and wherein the processing circuit is operable to provide a magnitude of a contact event.

21. The data storage system of claim 19, wherein the read signal is selected as the processing signal, and wherein the processing circuit is operable to provide data originally directed toward the storage medium.

22. The data storage system of claim 19, wherein the processing circuit includes a data detector circuit and a data decoder circuit.

23. The data storage system of claim 22, wherein the data decoder circuit is a low density parity check decoder circuit.

* * * * *